US012804139B2

(12) United States Patent
Ma et al.

(10) Patent No.: US 12,804,139 B2
(45) **Date of Patent: *Nov. 17, 2026**

(54) METHOD AND DEVICE FOR VIDEO ENCODING AND DECODING AND STORAGE MEDIUM

(71) Applicant: SZ DJI TECHNOLOGY CO., LTD., Shenzhen (CN)

(72) Inventors: Siwei Ma, Shenzhen (CN); Xuewei Meng, Shenzhen (CN); Shanshe Wang, Shenzhen (CN); Xiaozhen Zheng, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 71 days.

This patent is subject to a terminal disclaimer.

(21) Appl. No.: 18/809,144

(22) Filed: Aug. 19, 2024

(65) Prior Publication Data

US 2024/0414334 A1 Dec. 12, 2024

Related U.S. Application Data

(63) Continuation of application No. 17/937,139, filed on Sep. 30, 2022, now Pat. No. 12,069,252, which is a (Continued)

(51) Int. Cl.

*H04N 19/00* (2014.01)
*H04N 19/117* (2014.01)

(Continued)

(52) U.S. Cl.

CPC ......... *H04N 19/117* (2014.11); *H04N 19/186* (2014.11); *H04N 19/1883* (2014.11); *H04N 19/70* (2014.11); *H04N 19/82* (2014.11)

(58) Field of Classification Search

None

See application file for complete search history.

(56) References Cited

U.S. PATENT DOCUMENTS

2013/0259118 A1* 10/2013 Fu ........................ H04N 19/169 375/240.02
2014/0010278 A1 1/2014 Lou et al.

(Continued)

FOREIGN PATENT DOCUMENTS

CN 102857746 A 1/2013
CN 102857751 A 1/2013

(Continued)

OTHER PUBLICATIONS

The World Intellectual Property Organization (WIPO) International Search Report for PCT/CN2020/083371 Dec. 28, 2020 6 Pages.

(Continued)

*Primary Examiner* — Zhihan Zhou
(74) *Attorney, Agent, or Firm* — ANOVA LAW GROUP, PLLC

(57) ABSTRACT

A video encoding method includes encoding an image to generate a bitstream. In the bitstream, a first syntax element is configured to indicate whether a first chrominance component is filtered by adaptive loop filtering (ALF), and a second syntax element is configured to indicate whether a second chrominance component is filtered by the ALF. The ALF is not a cross-component ALF (CC-ALF) filter.

20 Claims, 7 Drawing Sheets

Related U.S. Application Data continuation of application No. PCT/CN2020/083371, filed on Apr. 3, 2020.

(51) Int. Cl.

| | |
|---|---|
| ***H04N 19/169*** | (2014.01) |
| ***H04N 19/186*** | (2014.01) |
| ***H04N 19/70*** | (2014.01) |
| ***H04N 19/82*** | (2014.01) |

(56) References Cited

U.S. PATENT DOCUMENTS

| | | | | |
|---|---|---|---|---|
| 2022/0408085 | A1* | 12/2022 | Lim | H04N 19/117 |
| 2023/0108509 | A1* | 4/2023 | Laroche | H04N 19/70 375/240.02 |
| 2023/0164360 | A1* | 5/2023 | Naser | H04N 19/188 375/240.26 |
| 2024/0098259 | A1* | 3/2024 | Misra | H04N 19/70 |

FOREIGN PATENT DOCUMENTS

| | | | |
|---|---|---|---|
| CN | 103891293 | A | 6/2014 |
| CN | 104735450 | A | 6/2015 |
| CN | 105120271 | A | 12/2015 |
| CN | 110199524 | A | 9/2019 |
| JP | 2014506061 | A | 3/2014 |
| JP | 2023510535 | A | 3/2023 |
| WO | 2019194647 | A1 | 10/2019 |
| WO | 2021141451 | A1 | 7/2021 |

OTHER PUBLICATIONS

Chen. Fangdong et al. "CE5-related: On high level syntax of CC-ALF", Joint Video Experts Team (JVET) of ITU-TSG 16 WP 3 and ISO/IEC JTC I/SC 29/WG 11 17th Meeting: Brussels, BE, Jan. 7-17, 2020.

Tsai CY, Chen C Y, Yamakage T, et al. Adaptive loop filtering for video coding[J]. IEEE Journal of Selected Topics in Signal Processing. 7(6). Jul. 2013: 934-945.

M. Karczewicz, L. Zhang, W.-J. Chien, and X. Li, "Geometry transformation-based adaptive in-loop filter," in Picture Coding Symposium (PCS), 2016. IEEE, 2016, pp. 1-5.

Misra (Sharplabs) K et al., "Cross-Component Adaptive Loop Filter for chroma", Motion Picture Expert Group or Iso/Iec JTC1/SC29/WG11, 127. Mpeg Meeting, Gothenburg, Jun. 26, 2019.

Chen J et al., "Algorithm description for Versatile Video Coding and Test Model 8 (VIM 8)", The Joint Video Exploration Team of ISO/IEC JTC1/SC29/WG11 and ITU-T, SG.16, 17. JVET Meeting, Brussels, Mar. 24, 2020.

Misr A, Kiran, et al. Cross-Component Adaptive Loop Filter for Chroma, Joint Video Experts Team (JVET) Input Document JVET-O0636-r1, 15th JVET Meeting, Jul. 2019.

Bross, Benjamin, et al. Versatile Video Coding (Draft 8), Joint Video Experts Team (JVET) Output Document, 17th JVET Meeting, Jan. 2020.

Xuewei Meng, et al., AHG9: On ALF/CC-ALF high level syntax, JVET-R0225-v1, Peking University, SZ DJI Technology Co., Ltd. Apr. 3, 2020.

* cited by examiner

METHOD AND DEVICE FOR VIDEO ENCODING AND DECODING AND STORAGE MEDIUM

CROSS-REFERENCE TO RELATED APPLICATION

This application is a continuation of application Ser. No. 17/937,139, filed on Sep. 30, 2022, which is a continuation of International Application No. PCT/CN2020/083371, filed Apr. 3, 2020, the entire contents of both of which are incorporated herein by reference.

TECHNICAL FIELD

The present disclosure relates to the field of digital video encoding technologies and, more particularly, to a video encoding and decoding method, a video encoding and decoding apparatus, and a storage medium.

BACKGROUND

Adaptive loop filtering (ALF) is one of the important technologies for video encoding and decoding. With this technology, a filtering coefficient is encoded, and a reconstructed image is filtered at a decoding end, to reduce compression distortion in a decoded image and provide a high-quality prediction reference image for subsequent encoding and decoding images to further increase compression efficiency.

In the existing ALF technology, various chrominance components of an image correspond to one filtering control switch, and this one filtering control switch is used to control the various chrominance components of the image. This manner of combining filtering control switches of the chrominance components into one affects consistency and readability of the chrominance components in an encoding process, thereby affecting efficiency and flexibility of video encoding. Therefore, how to better improve the efficiency and flexibility of video encoding becomes a research focus.

SUMMARY

Embodiments of the present disclosure provide a video encoding and decoding method, a video encoding and decoding apparatus, and a storage medium to simplify a process of writing a syntax element by an encoder and reading a syntax element by a decoder and improve flexibility and efficiency of video encoding/decoding.

In a first aspect, embodiments of the present disclosure provide a video encoding method, including:

- obtaining color components of an image sequence, the color components including two chrominance components;
- performing filtering on a reconstructed block of the color components of at least one image of the image sequence; and
- generating a bitstream of the image sequence, wherein different identifiers are used for the two chrominance components in a syntax element of an image level in the bitstream to indicate whether the corresponding chrominance components are filtered using adaptive loop filtering (ALF).

In a second aspect, embodiments of the present disclosure provide a video decoding method, including:

- obtaining a bitstream of an image sequence, wherein an image in the image sequence includes two chrominance components, and different identifiers are used for the two chrominance components in a syntax element of an image level in the bitstream to respectively indicate whether the corresponding chrominance components are filtered using ALF;
- parsing the bitstream to obtain the identifiers respectively corresponding to the two chrominance components of the current image; and
- determining, according to the identifiers corresponding to the two chrominance components, whether reconstructed blocks of the two chrominance components of the current image are filtered using ALF.

In a third aspect, embodiments of the present disclosure provide another video encoding method, including:

- obtaining color components of an image sequence, the color components including two chrominance components;
- performing filtering on a reconstructed block of the color components of at least one image in the image sequence using ALF; and
- generating a bitstream of the image sequence, wherein, for each chrominance component of the two chrominance components, a first identifier is used in a syntax element of an image block level in the bitstream to indicate whether the chrominance component is filtered using ALF, and when the first identifier indicates that the chrominance component is filtered using ALF, a second identifier is used to indicate an ALF filter used by the chrominance component.

In a fourth aspect, embodiments of the present disclosure provide another video decoding method, including:

- obtaining a bitstream of an image sequence, wherein an image in the image sequence includes two chrominance components, for each chrominance component of the two chrominance components, a first identifier in a syntax element of an image block level in the bitstream is used to indicate whether the chrominance component is filtered using ALF, and a second identifier is used to indicate an ALF filter used by the chrominance component;
- parsing the bitstream to obtain the first identifier and the second identifier respectively corresponding to the two chrominance components of the current image; and
- for each chrominance component of the current image, determining whether a reconstructed block of the chrominance component is filtered using ALF according to the first identifier corresponding to the chrominance component, and when the reconstructed block of the chrominance component is determined to be filtered using ALF, determining a corresponding ALF filter to perform filtering on the reconstructed block of the chrominance component according to the second identifier.

In a fifth aspect, embodiments of the present disclosure provide a video encoding device, including a memory and a processor.

The memory is used to store a program.

The processor is configured to call the program, and when the program is executed, the processor is configured to perform the following operations:

- obtaining color components of an image sequence, the color components including two chrominance components;
- performing filtering on a reconstructed block of the color components of at least one image of the image sequence; and generating a bitstream of the image sequence, wherein different identifiers are used for the two chrominance components in a syntax element of an image level in the bitstream to indicate whether the corresponding chrominance components are filtered by using ALF.

In a sixth aspect, embodiments of the present disclosure provide a video decoding device, comprising: a memory and a processor.

The memory is used to store a program.

The processor is configured to call the program, and when the program is executed, the processor is configured to perform the following operations:

obtaining a bitstream of an image sequence, wherein an image in the image sequence includes two chrominance components, and different identifiers are used for the two chrominance components in a syntax element of an image level in the bitstream to respectively indicate whether the corresponding chrominance components are filtered using ALF;

parsing the bitstream to obtain the identifiers respectively corresponding to the two chrominance components of the current image; and determining, according to the identifiers corresponding to the two chrominance components, whether reconstructed blocks of the two chrominance components of the current image are filtered using ALF.

In a seventh aspect, embodiments of the present disclosure provide another video encoding device, including a memory and a processor.

The memory is used to store a program.

The processor is configured to call the program, and when the program is executed, the processor is configured to perform the following operations:

obtaining color components of an image sequence, the color components including two chrominance components;

performing filtering on a reconstructed block of the color components of at least one image in the image sequence using ALF; and generating a bitstream of the image sequence, wherein, for each chrominance component of the two chrominance components, a first identifier is used in a syntax element of an image block level in the bitstream to indicate whether the chrominance component is filtered using ALF, and when the first identifier indicates that the chrominance component is filtered using ALF, a second identifier is used to indicate an ALF filter used by the chrominance component.

In an eighth aspect, embodiments of the present disclosure provide another video decoding device, including a memory and a processor.

The memory is used to store a program.

The processor is configured to call the program, and when the program is executed, the processor is configured to perform the following operations:

obtaining a bitstream of an image sequence, wherein an image in the image sequence includes two chrominance components, for each chrominance component of the two chrominance components, a first identifier in a syntax element of an image block level in the bitstream is used to indicate whether the chrominance component is filtered using ALF, and a second identifier is used to indicate an ALF filter used by the chrominance component;

parsing the bitstream to obtain the first identifier and the second identifier respectively corresponding to the two chrominance components of the current image; and for each chrominance component of the current image, determining whether constructed block of the chrominance component is filtered using ALF according to the first identifier corresponding to the chrominance component, and when the reconstructed block of the chrominance component is determined to be filtered using ALF, determining a corresponding ALF filter to perform filtering on the reconstructed block of the chrominance component according to the second identifier.

In a ninth aspect, embodiments of the present disclosure provide a computer-readable storage medium, the computer-readable storage medium storing a computer program that, when executed by a processor, causes the processor to implement the video encoding methods according to the first aspect and the third aspect, and the video decoding methods according to the second aspect and the fourth aspect.

In embodiments of the present disclosure, color components of an image sequence may be obtained, and filtering may be performed on the reconstructed block of the color components of at least one image of the image sequence using ALF to generate a bitstream of the image sequence. Different identifiers are used in the syntax element of the image level in the bitstream for the two chrominance components in the color components to indicate whether filtering is performed on the corresponding chrominance components using ALF. In this way, the process of writing the syntax element by the encoder and the process of reading the syntax element by the decoder may be simplified, and the flexibility and efficiency of video encoding/decoding may be improved.

BRIEF DESCRIPTION OF THE DRAWINGS

In order to illustrate embodiments of the present disclosure or the technical solutions of the existing technology more clearly, the accompanying drawings required in embodiments will be briefly introduced below. Apparently, the accompanying drawings in the following description are merely some embodiments of the present disclosure. For those of ordinary skill in the art, other drawings may be obtained according to these drawings without creative efforts.

DETAILED DESCRIPTION OF THE EMBODIMENTS

The technical solutions of embodiments of the present disclosure will be clearly and completely described below in connection with the accompanying drawings of embodiments of the present disclosure. Apparently, the described embodiments are merely some embodiments of the present disclosure, rather than all embodiments. All other embodiments obtained by those of ordinary skill in the art based on embodiments of the present disclosure without creative efforts should be within the scope of the present disclosure.

Some embodiments of the present disclosure will be described in detail below in connection with the accompanying drawings. When there is no conflict, the following embodiments and features of the embodiments may be combined with each other.

A video encoding method provided by embodiments of the present disclosure may be applied to a video encoding device. The video encoding device may be arranged on an intelligent terminal (e.g., a mobile phone, a tablet computer, etc.). In some embodiments, embodiments of the present disclosure may be applied to an aircraft (e.g., an unmanned aerial vehicle (UAV)). In some other embodiments, embodiments of the present disclosure may also be applied to another mobile platform (e.g., an unmanned ship, an unmanned vehicle, a robot, etc.), which is not specifically limited by the embodiments of the present disclosure.

The present disclosure is used for adaptive loop filtering (ALF) of in-loop filtering in versatile video coding (VVC) of a video coding standard and is mainly used to optimize ALF and cross-component ALF (CC-ALF) to remove redundancy, which makes the design more reasonable. A mainstream application form may be an encoder and decoder, which conforms to international video encoding standards H.264, high-efficiency video coding (HEVC), and Chinese AVS 2 standard, which can be used to improve compressed video quality and have important meaning for compression processing of a video such as a broadcast television, a television conference, and a network video.

Before embodiments of the present disclosure are introduced, ALF is described first.

In-loop filtering is a key part in a video encoding and decoding framework, which is mainly configured to reduce compression distortion such as a block effect or ringing effect generated in an encoding process. In one example, there are three in-loop filtering technologies, i.e., deblocking filtering (DBF), sample adaptive offset (SAO) filtering, and ALF. The DBF and the SAO filtering follow the method in HEVC. The deblocking filtering is used to predict edges of units and transform units. A low-pass filter obtained by training may be configured to perform non-linear weighting on edge pixels to reduce a block effect. By performing classification on pixels in an image block, the SAO filtering may add a same compensation value to each type of pixels to cause the reconstructed image to be closer to an original image to suppress the ringing effect.

Figure 1:
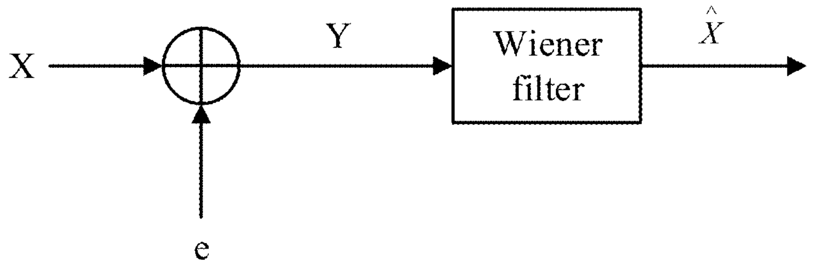
FIG. 1 is a schematic diagram showing principle of Wiener filtering.

In one embodiment, an ALF filter may be a Wiener filter that may be mainly configured to minimize a mean square error between the original image and the reconstructed image. The ALF filter may be an optimal filter under a mean square meaning calculated according to an original signal and a distortion signal after encoding, which is a Wiener filter in essence. As shown in FIG. 1, FIG. 1 is a schematic diagram showing a principle of the Wiener filter. In FIG. 1, X is an original signal, e is noise or distortion, Y is a distortion signal, and $\hat{X}$ is a signal after filtering.

Figure 2:
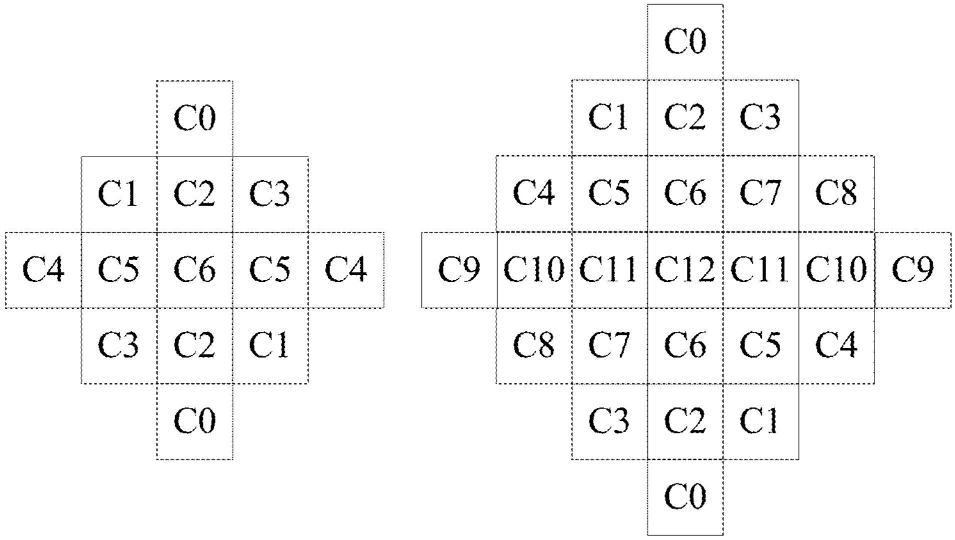
FIG. 2 is a schematic diagram showing a shape of adaptive loop filtering (ALF)

In one embodiment, in ALF of an example, a result of a current point after filtering may be obtained using a weighted average of surrounding pixel points. A position of a neighboring pixel point that is used is shown in FIG. 2. FIG. 2 is a schematic diagram showing a shape of ALF. As shown in FIG. 2, a rhombus shape of 5×5 and a rhombus shape of 7×7 are included. Assume that a point corresponding to C12 is the current point that is to be filtered, the filtering process may be obtained using a weighted average of all position points in FIG. 2. Filtering coefficients may be weights of the points. All together 13 filtering coefficients C0 to C12 may be included. An eventual filtering process includes multiplications of the points in FIG. 2 by the filtering coefficients corresponding to the points and a sum of the multiplications. The points used in this process are points in a reconstructed frame before ALF.

In an embodiment, in CC-ALF, an adjustment may be performed on the chrominance component using a value of a luminance component to improve the quality of the chrominance component. In certain embodiments, the CC-AF may be linear ALF. In some embodiments, in CC-ALF, processing may be performed on the chrominance component without modifying the value of the luminance component.

Figure 3:
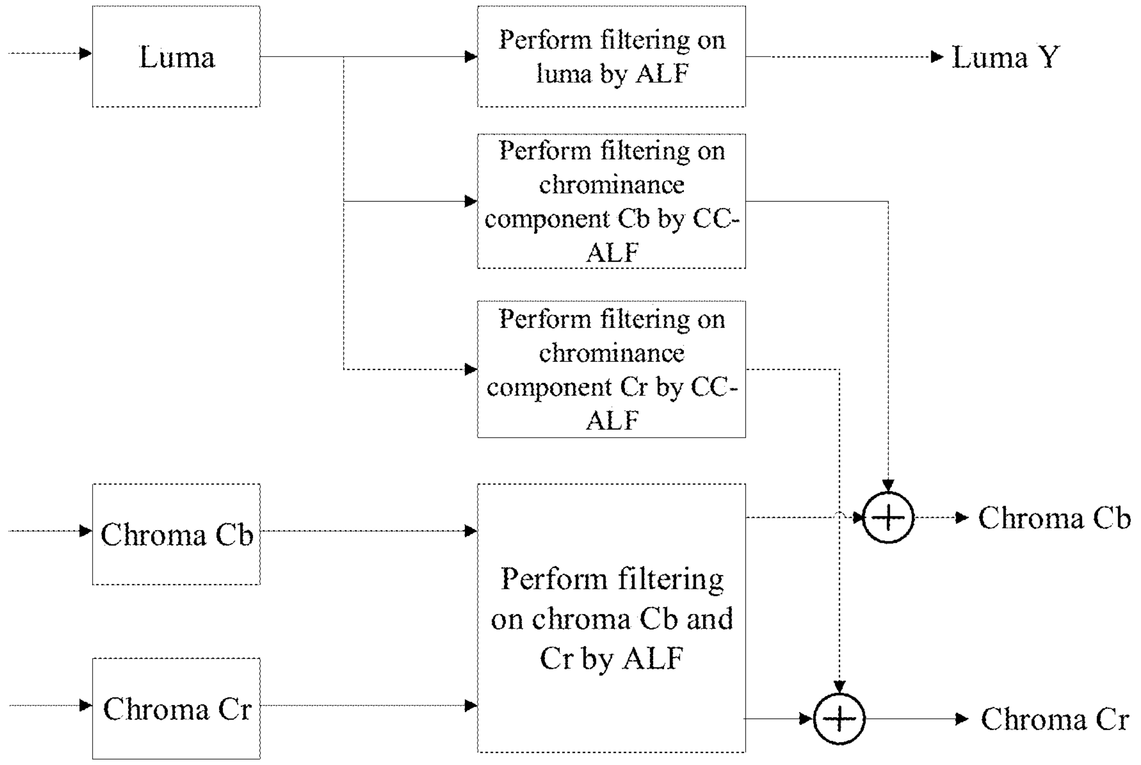
FIG. 3 is a schematic flowchart of cross-component ALF (CC-ALF)

In some embodiments, in CC-ALF, filtering may be performed on the chrominance component after ALF using the luminance component before ALF. In CC-ALF, the filter coefficients may be calculated jointly using the luminance component and the chrominance component and use the calculated filtering coefficients for filtering the chrominance component. A total flowchart of the filtering of CC-ALF is shown in FIG. 3. FIG. 3 is a schematic flowchart of CC-ALF. Firstly, filtering is performed on luma, and chroma Cb and Cr of an image using ALF, and further filtering is performed on chroma Cb and Cr of the image using CC-ALF, and then, chroma Cb and Cr after the filtering are determined according to a result obtained by performing the filtering on chroma Cb and Cr of the image using CC-ALF and a result obtained by performing the filtering on chroma Cb and Cr of the image using ALF.

Figure 4:
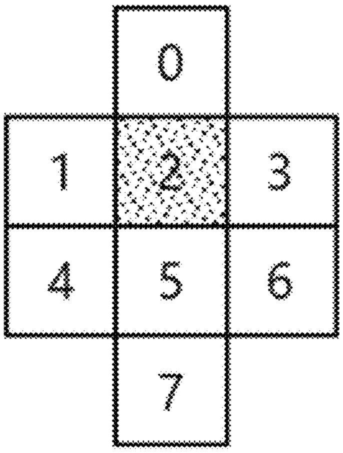
FIG. 4 is a schematic diagram showing a filter shape of CC-ALF.

In one embodiment, a shape of CC-ALF is as shown in FIG. 4. FIG. 4 is a schematic diagram of a filter shape of CC-ALF. As shown in FIG. 4, the filter shape of CC-ALF may be a 3×4 rhombus and have eight coefficients all together. Assume that a position where 2 is located is a current Cb or Cr component pixel point, and a result after filtering of the pixel point at the position where 2 is located may be obtained by weighted averaging of 7 points around 2.

At present, when the two chrominance components are filtered using ALF, the same identifier may be used for both chrominance components in the bitstream of the generated image sequence to indicate whether the corresponding chrominance component is filtered using ALF.

In an embodiment, a same identifier may be adopted for the two chrominance components in the syntax element of the image level in the bitstream to indicate whether the two chrominance components are filtered using ALF. Exemplarily, a same identifier ph_alf_chroma_idc may be used to indicate whether the two chrominance components are filtered using ALF for the two chrominance components in the syntax element of the image level in the bitstream. When ph_alf_chroma_idc is 0, ph_alf_chroma_idc may indicate that both the Cb and the Cr chrominance components are not filtered using ALF. When ph_alf_chroma_idc is 1, ph_alf_chroma_idc may indicate that the Cb chrominance component is filtered using ALF, and the CR chrominance component is not filtered using ALF. When ph_alf_chroma_idc is 2, ph_alf_chroma_idc may indicate that the Cb chrominance component is not filtered using ALF, and the Cr chrominance component is filtered using ALF. When ph_alf_chroma_idc is 3, ph_alf_chroma_idc may indicate that both the Cb, and the Cr chrominance components are filtered using ALF.

In an embodiment, a same identifier may be adopted for the two chrominance components in the syntax element of the image level in the bitstream to indicate whether the two chrominance components are filtered using ALF. Exemplarily, a same identifier slice_alf_chroma_idc may be used to indicate whether the two chrominance components are filtered using ALF for the two chrominance components in the syntax element of the image level in the bitstream. When slice_alf_chroma_idc is 0, slice_alf_chroma_idc may indicate that both the Cb and the Cr chrominance components are not filtered using ALF. When slice_alf_chroma_idc is 1, slice_alf_chroma_idc may indicate that the Cb chrominance component is filtered using ALF, and the CR chrominance component is not filtered using ALF. When slice_alf_chroma_idc is 2, slice_alf_chroma_idc may indicate that the Cb chrominance component is not filtered using ALF, and the Cr chrominance component is filtered using ALF. When slice_alf_chroma_idc is 3, slice_alf_chroma_idc may indicate that both the Cb, and the Cr chrominance components are filtered using ALF.

In an embodiment, for the two chrominance components in the syntax element of the image block level in the bitstream, an alf_ctb_cc_cb_idc identifier may be used to indicate whether the chrominance component Cb is filtered using CC-ALF, and an alf_ctb_cc_cr_idc identifier may be used to indicate whether the chrominance component Cr is filtered using CC-ALF. Taking the alf_ctb_cc_cb_idc as an example, if the alf_ctb_cc_cb_idc is 0, the alf_ctb_cc_cb_idc may indicate that the chrominance component Cb is not filtered using CC-ALF. If alf_ctb_cc_cb_idc is greater than 0, the alf_ctb_cc_cb_idc may indicate that the Cb chrominance component is filtered using CC-ALF.

It can be seen that using the same identifier to indicate whether an ALF filter is adopted to perform filtering may increase redundancy and affect the consistency and readability of the encoded chrominance component.

In embodiments of the present disclosure, for the above problem, the unified identifier used by the chrominance components in traditional ALF may be deleted. The syntax element may be re-designed to set different identifiers corresponding to the chrominance components in ALF to indicate whether the corresponding chrominance components are filtered using ALF, which is beneficial to simplify the process of writing the syntax element by the encoder by the encoder and reading the syntax element by the decoder by the decoder to improve the flexibility and efficiency of video encoding/decoding.

In an embodiment, for the chrominance component of ALF in the image level, in embodiments of the present disclosure, the ph_alf_chroma_idc may be deleted. A ph_alf_cb_enabled_flag may be used to indicate whether the chrominance component Cb is filtered using ALF, and a ph_alf_cr_enabled_flag may be used to indicate that the chrominance component Cr is filtered using ALF.

In an embodiment, for the chrominance component of ALF in the slice level, in embodiments of the present disclosure, the slice_alf_chroma_idc may be deleted. A slice_alf_cb_enabled_flag may be used to indicate whether the chrominance component Cb is filtered using ALF, and a slice_alf_cr_enabled_flag may be used to indicate whether the chrominance component Cr is filtered using ALF.

In an embodiment, for the chrominance component of ALF in a coding tree unit (CTU) level, in embodiments of the present disclosure, an alf_ctb_cc_cb_flag and an alf_ctb_cc_cb_idx may be used for the chrominance component Cb to indicate whether the chrominance component Cb is filtered using CC-ALF. The identifier alf_ctb_cc_cb_flag may be used to indicate whether the chrominance component Cb is filtered using CC-ALF. If so, then the identifier alf_ctb_cc_cb_idx may be further used to indicate an index of a CC-ALF filter used by the chrominance component Cb. Similarly, in embodiments of the present disclosure, an alf_ctb_cc_cr_flag and an alf_ctb_cc_cr_idx may be used to indicate whether the chrominance component Cr is filtered using CC-ALF, where the identifier alf_ctb_cc_cr_flag may be used to indicate whether the chrominance component Cr is used by CC-ALF. If so, then the identifier alf_ctb_cc_cr_idx may be further used to indicate the index of a CC-ALF filter used by the chrominance component Cr.

It can be seen that, with the implementation of embodiments of the present disclosure, redundancy may be reduced to simplify the process of writing the syntax element by the encoder and reading the syntax element by the decoder and improve the flexibility and efficiency of video coding/decoding.

Methods of video encoding and video decoding provided by embodiments of the present disclosure are described below in connection with FIGS. 5 to 8.

Figure 5:
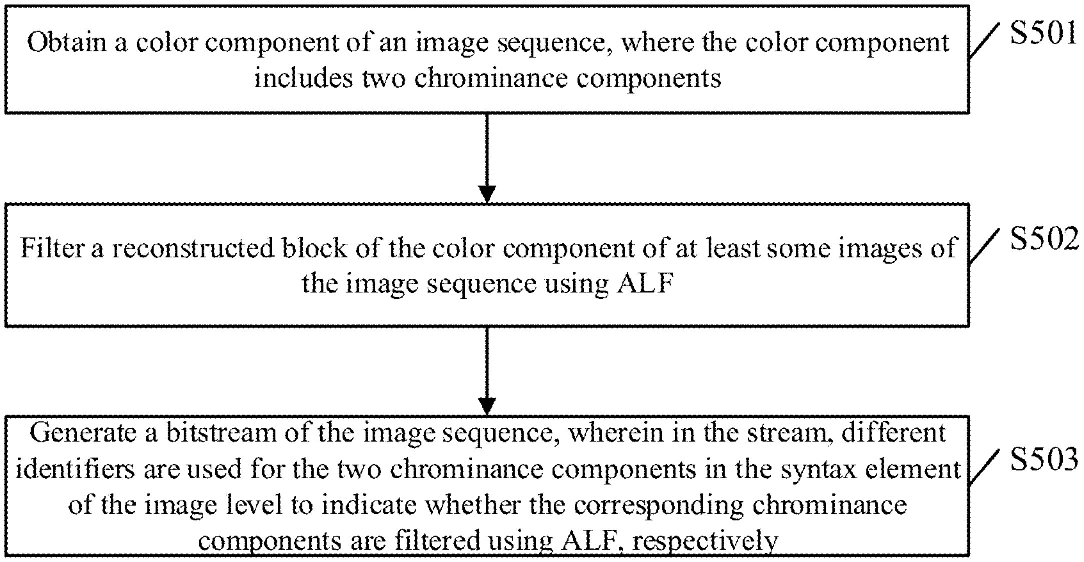
FIG. 5 is a schematic flowchart of a video encoding method according to some embodiments of the present disclosure.

Specifically, refer to FIG. 5, FIG. 5 is a schematic flowchart of a video encoding method according to embodiments of the present disclosure. The method may be applied to a video encoding device. The video encoding device may be arranged on an intelligent terminal. Specifically, the method of embodiments of the present disclosure includes the following steps.

At S501, color components of an image sequence are obtained, where the color components include two chrominance components.

In embodiments of the present disclosure, a video encoding device may be configured to obtain the color components of the image sequence. The color components may include two chrominance components. In some embodiments, the two chrominance components may include both chrominance components Cb and Cr.

At Step 502, a reconstructed block of the color components of at least one image of the image sequence is filtered using ALF.

In embodiments of the present disclosure, the video encoding device may be configured to filter the reconstructed block of the color components of the at least one image of the image sequence using ALF.

In an embodiment, when the video encoding device performs filtering on the reconstruction block of the color components of the at least one image of the image sequence using ALF, pixel values of pixel points in the reconstructed block of the color components of the at least part some images of the image sequence may be obtained, and filtering coefficients of the pixel points in the reconstructed block may be determined. The filter coefficients of the pixel points may be used as weights, and products of the pixel values of the pixel points and the corresponding filter coefficients may be accumulated to obtain a filtered result.

In an embodiment, the filtering coefficients may be determined according to classifications of the pixel points by classifying the pixel points, where pixel points of a same classification may correspond to a same set of filtering coefficients. By taking the rhombus of 5×5 in FIG. 2 as an example, 7 filtering coefficients C0 to C6 exist in the reconstructed block. Pixel points corresponding to a same filtering coefficient may belong to a same classification.

In some embodiments, the pixel points may be classified by a plurality of manners, which is not specifically limited in embodiments of the present disclosure. By taking an existing exemplary classification manner as an example, in the existing technology, only the luminance component Y may be classified, and the chrominance components U and V are not classified, where the component Y may be classified into 25 classifications, and components U and V may have only one classification. That is, for a frame of the image, the component Y may have more than 25 sets of filters, and the components U and V may only have one set.

In an embodiment, each 4×4 block may be classified according to a Laplace direction.

$$C = 5D + \hat{A} \tag{1}$$

where C denotes a classification to which the pixel block belongs, Â denotes a fine classification result after the classification, Â may be obtained in a plurality of manners and only represents the fine classification result, and D denotes a direction. A calculation manner of the direction D is as follows:

$$g_v = \sum_{k=i-2}^{i+3} \sum_{l=j-2}^{j+3} V_{k,l},\ V_{k,l} = |2R(k,l) - R(k,l-1) - R(k,l+1)| \tag{2}$$

$$g_h = \sum_{k=i-2}^{i+3} \sum_{l=j-2}^{j+3} H_{k,l},\ H_{k,l} = |2R(k,l) - R(k,l-1) - R(k,l+1)|$$

$$g_{d1} = \sum_{k=i-2}^{i+3} \sum_{l=j-2}^{j+3} D1_{k,l},\ D1_{k,l} = |2R(k,l) - R(k,l-1) - R(k,l+1)|$$

$$g_{d2} = \sum_{k=i-2}^{i+3} \sum_{l=j-2}^{j+3} D2_{k,l},\ D2_{k,l} = |2R(k,l) - R(k,l-1) - R(k,l+1)|$$

where (i, j) denotes a coordinate position of a current 4×4 block in the entire image, R(k, l) denotes a pixel value located at position (k, l) in the 4×4 block, $V_{k,l}$ denotes a Laplace gradient in a vertical direction of the pixel point located at coordinate (i, j) in the 4×4 block, $H_{k,j}$ denotes a Laplace gradient in a horizontal direction of the pixel point located at coordinate (i, j) in the 4×4 block, $D1_{k,l}$ denotes a Laplace gradient of the pixel point located at coordinate (i, j) in the 4×4 block in a direction of 135°, $D2_{k,l}$ denotes a Laplace gradient of the pixel point located at coordinate (i, j) in the 4×4 block in a direction of 45°, $g_v$ denotes a Laplace gradient of the 4×4 block in the horizontal direction, $g_h$ denotes a Laplace gradient of the 4×4 block in the direction of 135°, $g_{d2}$ denotes a Laplace gradient of the 4×4 block in the degree direction of 45°, i and j denote coordinates of an upper left pixel point of the 4×4 block, and R(i, j) denotes a reconstructed pixel value at the coordinate (i, j). The calculation manner of D is as follows:

$$g_{h,v}^{max} = \max(g_h, g_v),\ g_{h,v}^{min} = \min(g_h, g_v) \tag{3}$$

$$g_{d1,d2}^{max} = \max(g_{d1}, g_{d2}),\ g_{d1,d2}^{min} = \min(g_{d1}, g_{d2})$$

$$R_{h,v} = g_{h,v}^{max} / g_{h,v}^{min}$$

$$R_{d0,d2} = g_{d1,d2}^{max} / g_{d1,d2}^{min}$$

where $$g_{h,v}^{max}$$

denotes a maximal value of the Laplace gradient value in the horizontal and vertical directions, $$g_{h,v}^{min}$$

denotes a minimum value of the Laplace gradient value in the horizontal and vertical directions, $$g_{d1,d2}^{max}$$

denotes a maximum value of a Laplace gradient value in the directions of 45° and 135°, $$g_{d1,d2}^{min}$$

denotes a minimum value of the Laplace gradient value of a Laplace gradient value in the directions of 45° and 135°, $R_{h,v}$ denotes a ratio of the Laplace gradients in the horizontal direction and the vertical direction, and $R_{d0,d1}$ denotes a ratio of the Laplace gradients in the direction of 45° and 135°.

If $g_{h,v}^{max} \le t_1 \cdot g_{h,v}^{min}$ and $g_{d0,d1}^{max} \le t_1 \cdot g_{d0,d1}^{min}$, $D$ may be set to 0.

If $g_{h,v}^{max}/g_{h,v}^{min} > g_{d0,d1}^{max}/g_{d0,d1}^{min}$ and $g_{h,v}^{max} \le t_2 \cdot g_{h,v}^{min}$, $D$ may be set to 1.

If $g_{h,v}^{max}/g_{h,v}^{min} > g_{d0,d1}^{max}/g_{d0,d1}^{min}$ and $g_{h,v}^{max} > t_2 \cdot g_{h,v}^{min}$, $D$ may be set to 2.

If $g_{h,v}^{max}/g_{h,v}^{min} \le g_{d0,d1}^{max}/g_{d0,d1}^{min}$ and $g_{d0,d1}^{max} \le t_1 \cdot g_{d0,d1}^{min}$, $D$ may be set to 3.

If $g_{h,v}^{max}/g_{h,v}^{min} \le g_{d0,d1}^{max}/g_{d0,d1}^{min}$ and $g_{d0,d1}^{max} > t_1 \cdot g_{d0,d1}^{min}$, $D$ may be set to 4. $t1$ and t2 may represent predetermined thresholds.

The calculation manner of Â is as follows:

$$A = \sum_{k=i-2}^{i+3} \sum_{l=j-2}^{j+3} (V_{k,l} + H_{k,l}) \tag{4}$$

A may be quantized to obtain an integer between 0 and 4, to obtain Â.

At S503, a bitstream of the image sequence is generated, wherein in the bitstream, different identifiers are used for the two chrominance components in the syntax element of the image level to indicate whether the corresponding chrominance components are filtered using ALF, respectively.

In embodiments of the present disclosure, the video encoding device may be configured to generate the bitstream of the image sequence, where, in the bitstream, different identifiers may be used for the two chrominance components in the syntax element of the image level to indicate whether the corresponding chrominance components are filtered using ALF filter.

In an embodiment, a ph_alf_cb_enabled_flag may be used as an identifier for the chrominance component Cb in the syntax element of the image level in the bitstream, which may be used to indicate whether the chrominance component Cb is filtered using ALF filter.

In an embodiment, a ph_alf_cr_enabled_flag may be used as an identifier for the chrominance component Cr in the syntax element of the image level in the bitstream, which may be used to indicate whether the chrominance component Cr is filtered using ALF filter.

The representation of the syntax elements of the chrominance components Cb and Cr in the image level is shown in Table 1 below.

TABLE 1

```
if(sps_alf_enabled_flag && alf_info_in_ph_flag) {
  ph_alf_enabled_flag                                   u(1)
  if(ph_alf_enabled_flag) {
    ph_num_alf_aps_ids_luma                             u(3)
    for(i = 0; i < ph_num_alf_aps_ids_luma; i++)
      ph_alf_aps_id_luma[i]                             u(3)
    if(ChromaArrayType != 0){
      ph_alf_cb_enabled_flag                            u(1)
      ph_alf_cr_enabled_flag                            u(1)
    }
    if(ph_alf_cb_enabled_flag || ph_alf_cr_enabled_flag)
      ph_alf_aps_id_chroma                              u(3)
    if(sps_CC-ALF_enabled_flag) {
      ph_cc_alf_cb_enabled_flag                         u(1)
      if(ph_cc_alf_cb_enabled_flag)
        ph_cc_alf_cb_aps_id                             u(3)
      ph_cc_alf_cr_enabled_flag                         u(1)
      if(ph_cc_alf_cr_enabled_flag)
        ph_cc_alf_cr_aps_id                             u(3)
    }
  }
}
```

In an embodiment, different identifiers may be used for the two chrominance components in the syntax element of the slice level in the bitstream to indicate whether the corresponding chrominance components are filtered using ALF filter, respectively.

In an embodiment, a slice_alf_cb_enabled_flag may be used as an identifier for the chrominance component Cb in the syntax element of the slice level in the bitstream, which may be used to indicate whether the chrominance component Cb is filtered using ALF filter.

In an embodiment, a slice_alf_cr_enabled_flag may be used as an identifier for the chrominance component Cr in the syntax element of the slice level in the bitstream, which may be used to indicate whether the chrominance component Cr is filtered using ALF filter.

The representation of the syntax elements of the chrominance components Cb and Cr in the slice level is shown in Table 2 below.

TABLE 2

TABLE 2-continued

```
if(sps_alf_enabled_flag && alf_info_in_ph_flag) {
  slice_alf_enabled_flag                                u(1)
  if(slice_alf_enabled_flag) {
    slice_num_alf_aps_ids_luma                          u(3)
    for(i = 0; i < slice _num_alf_aps_ids_luma; i++)
      slice_alf_aps_id_luma[i]                          u(3)
    if(ChromaArrayType != 0){
      slice_alf_cb_enabled_flag                         u(1)
      slice_alf_cr_enabled_flag                         u(1)
    }
    if(slice_alf_cb_enabled_flag || ph_alf_cr_enabled_flag)
      slice_alf_aps_id_chroma                           u(3)
    if(sps_CC-ALF_enabled_flag) {
      slice_cc_alf_cb_enabled_flag                      u(1)
      if(slice_cc_alf_cb_enabled_flag)
        slice_cc_alf_cb_aps_id                          u(3)
      slice_cc_alf_cr_enabled_flag                      u(1)
      if(slice_cc_alf_cr_enabled_flag)
        slice_cc_alf_cr_aps_id                          u(3)
    }
  }
}
```

In an embodiment, in the bitstream, for each chrominance component of the two chrominance components, a first identifier may be used in the syntax element of the image block level in the bitstream to indicate whether the chrominance component is filtered using ALF. When the first identifier indicates that the chrominance component is filtered using ALF, a second identifier may be used to indicate the ALF filter adopted by the chrominance component. In some embodiments, the ALF filter may be a CC-ALF filter. In some embodiments, the image block level may be a CTU level, wherein one CTU may include a luma coding tree block (CTB), two chroma CTBs, and a syntax element.

In an embodiment, an alf_ctb_cc_cb_flag may be used as a first identifier for the chrominance component Cb in the syntax element of the image block level in the bitstream, which may be used to indicate whether the chrominance component Cb is filtered by using the CC-ALF filter. If the CC-ALF filter is used to perform filtering, then an alf_ctb_cc_cb_idx may be further used as a second identifier, which may be used to identify the index of the CC-ALF filter adopted by the chrominance component Cb.

In an embodiment, an alf_ctb_cc_cr_flag may be used as a first identifier for the chrominance component Cr in the syntax element of the image block level in the bitstream, which may be used to indicate whether the chrominance component Cr is filtered by using CC-ALF. If the CC-ALF filter is used to perform filtering, then an alf_ctb_cc_cr_idx may be further used as a second identifier, which may be used to identify the index of the CC-ALF filter adopted by the chrominance component Cr. In some embodiments, the second identifier may be calculated according to the first identifier. In some embodiments, when the chrominance component is determined to be filtered in the syntax element of the image block level using CC-ALF, the second identifier may be determined according to a difference between the first identifier and 1.

The representation of the syntax elements of the chrominance components Cb and Cr at the image block level is shown in Table 3 below.

TABLE 3

| | |
|---|---|
| if(slice_alf_enabled_flag) { | |
| alf_ctb_flag[0][CtbAddrX][CtbAddrY] | ae(v) |
| if(alf_ctb_flag[0][CtbAddrX][CtbAddrY]) { | |
| if(slice_num_alf_aps_ids_luma > 0) | |
| alf_use_aps_flag | ae(v) |
| if(alf_use_aps_flag) { | |
| if(slice_num_alf_aps_ids_luma > 1) | |
| alf_luma_prev_filter_idx | ae(v) |
| } else | |
| alf_luma_fixed_filter_idx | ae(v) |
| } | |
| if(slice_alf_cb_enabled_flag) { | |
| alf_ctb_flag[1][CtbAddrX][CtbAddrY] | ae(v) |
| if(alf_ctb_flag[1][CtbAddrX][CtbAddrY] && alf_chroma_num_alt_filters_minus1 > 0) | |
| alf_ctb_filter_alt_idx[0][CtbAddrX][CtbAddrY] | ae(v) |
| } | |
| if(slice_alf_cr_enabled_flag) { | |
| alf_ctb_flag[2][CtbAddrX][CtbAddrY] | ae(v) |
| if(alf_ctb_flag[2][CtbAddrX][CtbAddrY] && alf_chroma_num_alt_filters_minus1 > 0) | |
| } | |
| } | |
| if(slice_cc_alf_cb_enabled_flag){ | |
| alf_ctb_cc_cb_flag[CtbAddrX][CtbAddrY] | ae(v) |
| if (alf_ctb_cc_cb_flag[CtbAddrX][CtbAddrY] && alf_cc_cb_filters_signalled_minus1 > 0) | |
| alf_ctb_cc_cb_idx[CtbAddrX][CtbAddrY] | ae(v) |
| } | |
| if(slice_cc_alf_cr_enabled_flag) { | |
| alf_ctb_cc_cr_flag[CtbAddrX][CtbAddrY] | ae(v) |
| if (alf_ctb_cc_cr_flag[CtbAddrX][CtbAddrY] && alf_cc_cr_filters_signalled_minus1 > 0) | |
| alf_ctb_cc_cr_idx[CtbAddrX][CtbAddrY] | ae(v) |
| } | |

In embodiments of the present disclosure, the video encoding device may be configured to obtain the color components that includes two chrominance components of the image sequence, perform filtering on the reconstructed block of the color components of the at least one image of the image sequence using ALF, and generate the bitstream of the image sequence, where different identifiers may be used for the two chrominance components in the syntax elements of the image level in the bitstream to indicate whether the corresponding chrominance components are filtered using ALF filter, respectively. In the embodiment, the process of writing the syntax element by the encoder may be simplified by using different identifiers when filtering using ALF is performed, to improve the efficiency and flexibility of video encoding.

Figure 6:
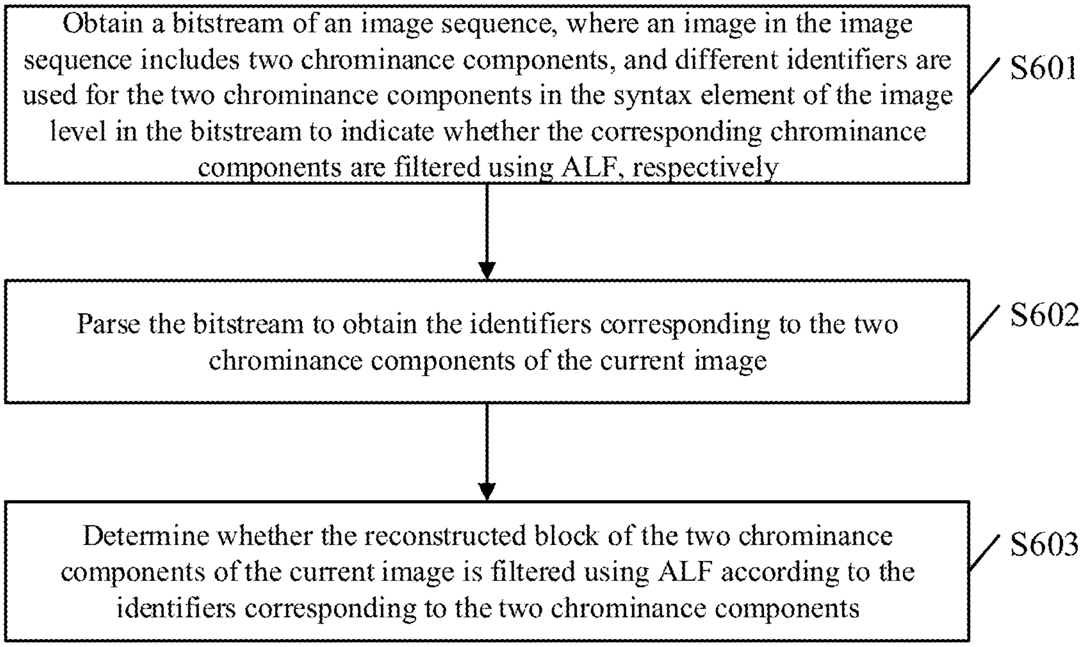
FIG. 6 is a schematic flowchart of a video decoding method according to some embodiments of the present disclosure.

Referring to FIG. 6, FIG. 6 is a schematic flowchart of a video decoding method according to embodiments of the present disclosure. The method may be applied to a video decoding device. The video decoding device may be arranged on an intelligent terminal (e.g., a mobile phone, a tablet computer, etc.). Specifically, the method of embodiments of the present disclosure includes the following steps.

At S601, a bitstream of an image sequence is obtained, where an image in the image sequence includes two chrominance components, and different identifiers are used for the two chrominance components in the syntax element of the image level in the bitstream to indicate whether the corresponding chrominance components are filtered using ALF, respectively.

In embodiments of the present disclosure, the video decoding device may be configured to obtain the bitstream of the image sequence. The image in the image sequence may include two chrominance components. Different identifiers may be used for the two chrominance components in the syntax element of the image level in the bitstream to indicate whether the corresponding chrominance components are filtered using ALF, respectively.

In an embodiment, different identifiers may be for the two chrominance components in the syntax element of the image level in the bitstream to indicate whether the corresponding chrominance components are filtered using ALF filter.

In an embodiment, in the bitstream, for each chrominance component of the two chrominance components, a first identifier may be used in the syntax element of the image block level in the bitstream to indicate whether the chrominance component is filtered using ALF. When the first identifier indicates that the chrominance component is filtered using ALF, a second identifier may be used to indicate the ALF filter adopted by the chrominance component. In some embodiments, the ALF filter may be a CC-ALF filter. In some embodiments, the image block level may be a CTU level.

At S602, the bitstream is parsed to obtain the identifiers corresponding to the two chrominance components of the current image.

In embodiments of the present disclosure, the video decoding device may be configured to parse the bitstream to obtain the identifiers corresponding to the two chrominance components of the current image.

In an embodiment, the video decoding device may be configured to parse the bitstream in a context manner to obtain first identifiers corresponding to the two chrominance components of the current image, and/or parse the bitstream in a truncated unary manner to obtain second identifiers corresponding to the two chrominance components of the current image.

At S603, whether the reconstructed blocks of the two chrominance components of the current image are filtered using ALF is determined according to the identifiers corresponding to the two chrominance components.

In embodiments of the present disclosure, the video decoding device may be configured to determine, according to the identifiers corresponding to the two chrominance components, whether the reconstructed blocks of two chrominance components of the current image are filtered using ALF.

In embodiments of the present disclosure, the video decoding device may be configured to obtain the bitstream of the image sequence, wherein the image in the image sequence includes the two chrominance components, and different identifiers are used for the two chrominance components in the syntax element of the image level in the bitstream to indicate whether the corresponding chrominance components are filtered using ALF, and parse the bitstream to obtain the identifiers corresponding to the two chrominance components of the current image to determine, according to the identifiers corresponding to the two chrominance components, whether the reconstructed blocks of the two chrominance components of the current image is filtered using ALF. In this embodiment, the process of reading the syntax element by the decoder may be simplified by using different identifiers when the filtering is performed using ALF, and the efficiency and flexibility of video decoding may be improved.

Figure 7:
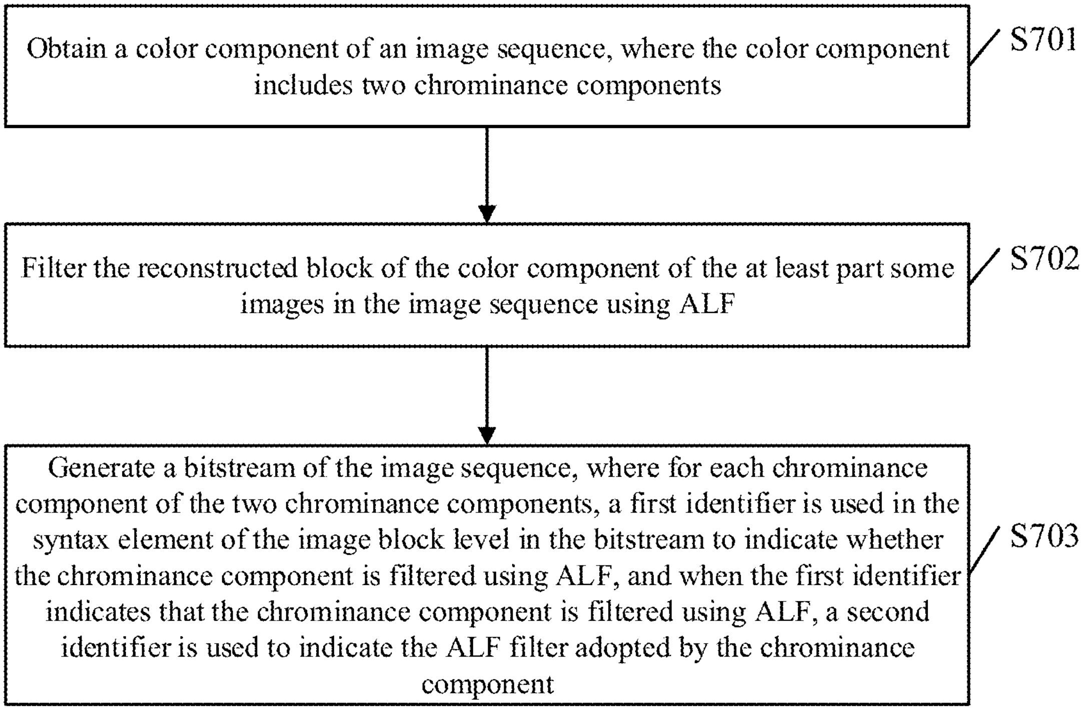
FIG. 7 is a schematic flowchart of another video encoding method according to some embodiments of the present disclosure.

Referring to FIG. 7, FIG. 7 is a schematic flowchart of another video encoding method according to some embodiments of the present disclosure. The method may be applied to a video encoding device. The video decoding device may be arranged on an intelligent terminal (e.g., a mobile phone, a tablet computer, etc.). Specifically, the method of embodiments of the present disclosure includes the following steps.

At S701, color components of an image sequence are obtained, where the color components include two chrominance components.

In embodiments of the present disclosure, the video encoding device may be configured to obtain the color components of the image sequence. The color components may include the two chrominance components.

At S702, the reconstructed block of the color components of the at least one image in the image sequence is filtered using ALF.

In embodiments of the present disclosure, the video encoding device may be configured to perform the filtering on the reconstructed block of the color components of the at least one image in the image sequence using ALF. In some embodiments, an implementation process of performing the filtering on the reconstructed block of the color components of the at least one image in the image sequence by the video encoding device using ALF is as described above, which is not repeated here.

At S703, a bitstream of the image sequence is generated, where for each chrominance component of the two chrominance components, a first identifier is used in the syntax element of the image block level in the bitstream to indicate whether the chrominance component is filtered using ALF, and when the first identifier indicates that the chrominance component is filtered using ALF, a second identifier is used to indicate the ALF filter adopted by the chrominance component.

In embodiments of the present disclosure, the video encoding device may be configured to generate the bitstream of the image sequence. For each chrominance component of the two chrominance components, the first identifier is used in the syntax element of the image block level in the bitstream to indicate whether the chrominance component is filtered using ALF. When the first identifier indicates that the chrominance component is filtered using ALF, the second identifier may be used to indicate the ALF filter adopted by the chrominance component. In some embodiments, the ALF filter may include a CC-ALF filter. In some embodiments, the image block level may be a CTU level.

In an embodiment, the first identifier may be encoded in a context manner, and/or the second identifier may be encoded in a truncated unary manner.

In an embodiment, different identifiers may be used for the two chrominance components in the syntax element of the image level in the bitstream to indicate whether the corresponding chrominance components are filtered using ALF, respectively.

In an embodiment, different identifiers may be used for the two chrominance components in the syntax element of the slice level in the bitstream to indicate whether the corresponding chrominance components are filtered using ALF, respectively.

In embodiments of the present disclosure, the video encoding device may be configured to obtain the color components that include the two chrominance components of the image sequence, perform the filtering on the reconstructed block of the color components of the at least one image in the image sequence using ALF, and generate the bitstream of the image sequence. For each chrominance component of the two chrominance components, the first identifier may be used in the syntax element of the image block level in the bitstream to indicate whether the chrominance component is filtered using ALF. When the first identifier indicates that the chrominance component is filtered using ALF, the second identifier may be used to indicate the ALF filter adopted by the chrominance component. In the embodiment, the process of writing the syntax element by the encoder may be simplified by using the first identifier and the second identifier when the filtering is performed using CC-ALF, and the efficiency and flexibility of video encoding may be improved.

Figure 8:
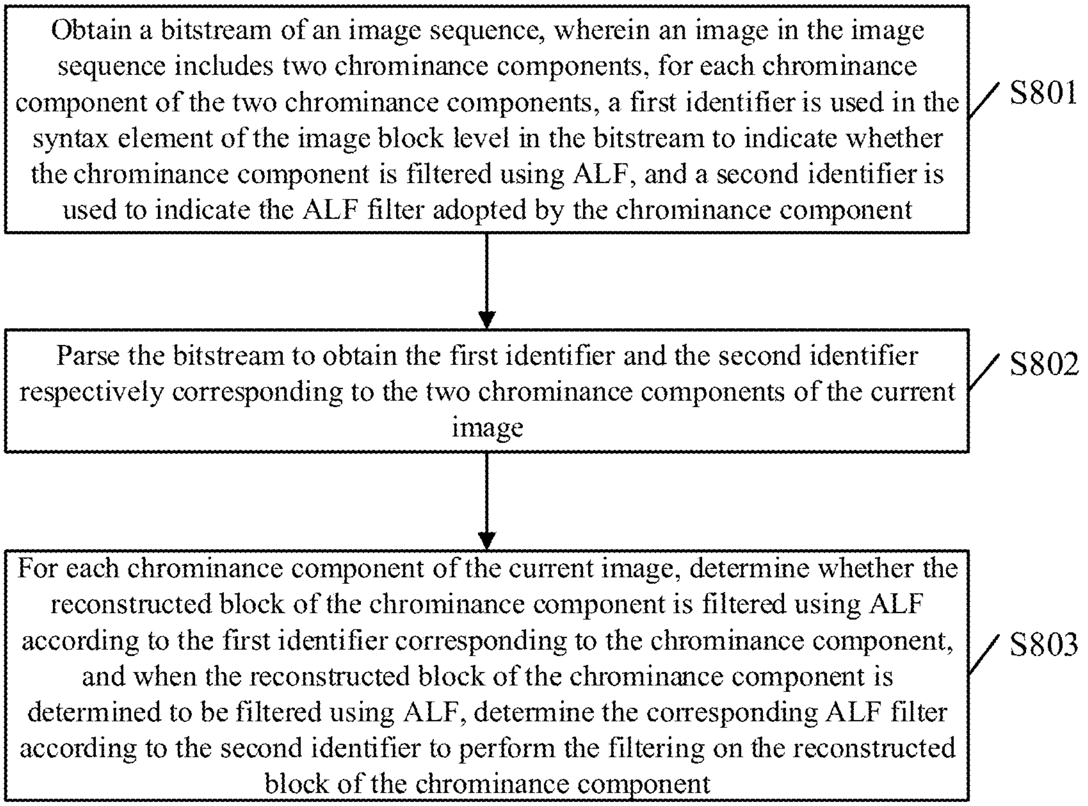
FIG. 8 is a schematic flowchart of another video decoding method according to some embodiments of the present disclosure.

Referring to FIG. 8, FIG. 8 is a schematic flowchart of another video decoding method according to some embodiments of the present disclosure. The method may be applied to a video decoding device. The video decoding device may be arranged on an intelligent terminal (e.g., a mobile phone, a tablet computer, etc.). Specifically, the method of embodiments of the present disclosure includes the following steps.

At S801, a bitstream of an image sequence is obtained, wherein an image in the image sequence includes two chrominance components, for each chrominance component of the two chrominance components, a first identifier is used in the syntax element of the image block level in the bitstream to indicate whether the chrominance component is filtered using ALF, and a second identifier is used to indicate the ALF filter adopted by the chrominance component.

In embodiments of the present disclosure, the video decoding device may be configured to obtain the bitstream of the image sequence, where the image in the image sequence may include the two chrominance components, for each chrominance component of the two chrominance components, use the first identifier in the syntax element of the image block level in the bitstream to indicate whether the chrominance component is filtered using ALF, and use the second identifier to indicate the ALF filter adopted by the chrominance component. In some embodiments, the ALF filter may be a CC-ALF filter, and the image block level may be a CTU level.

In an embodiment, different identifiers may be used for the two chrominance components in the syntax element of the image level in the bitstream to indicate whether the corresponding chrominance components are filtered using ALF, respectively.

In an embodiment, different identifiers may be used for the two chrominance components in the syntax element of the slice level in the bitstream to indicate whether the corresponding chrominance components are filtered using ALF, respectively.

At S802, the bitstream is parsed to obtain the first identifier and the second identifier respectively corresponding to the two chrominance components of the current image.

In embodiments of the present disclosure, the video decoding device may be configured to parse the bitstream to obtain the first identifier and the second identifier respectively corresponding to the two chrominance components of the current image.

In an embodiment, the video decoding device may be configured to parse the bitstream in a context manner to obtain the first identifier corresponding to the two chrominance components of the current image and parse the bitstream in a truncated unary manner to obtain the second identifier corresponding to the two chrominance components of the current image.

At S803, for each chrominance component of the current image, whether the reconstructed block of the chrominance component is filtered using ALF is determined according to the first identifier corresponding to the chrominance component, and when the reconstructed block of the chrominance component is determined to be filtered using ALF, the corresponding ALF filter is determined according to the second identifier to perform the filtering on the reconstructed block of the chrominance component.

In embodiments of the present disclosure, the video decoding device may be configured to determine, for each chrominance component of the current image block, whether the reconstructed block of the chrominance component is filtered using ALF according to the first identifier corresponding to the chrominance component, and when the reconstructed block of the chrominance component is determined to be filtered using ALF, determine, according to the second identifier, the corresponding ALF filter to perform the filtering on the reconstructed block of the chrominance component.

In embodiments of the present disclosure, the video decoding device may be configured to obtain the bitstream of the image sequence, wherein the image in the image sequence may include the two chrominance components, for each chrominance component of the two chrominance components, the first identifier may be used in the syntax element of the image block level in the bitstream to indicate whether the chrominance component is filtered using ALF, and the second identifier may be used to indicate the ALF filter adopted by the chrominance component, parse the bitstream to obtain the first identifier and the second identifier corresponding to the two chrominance components of the current image, for each chrominance component of the current image block, determine, according to the first identifier corresponding to the chrominance component, whether the reconstructed block of the chrominance component is filtered using ALF, and when the reconstructed block is determined to be filtered using ALF, determine the corresponding ALF according to the second identifier to perform filtering on the reconstructed block of the chrominance component. In the embodiment, when the filtering is performed using CC-ALF, the process of reading the syntax element by the decoder may be simplified by using the first identifier and the second identifier, and the efficiency and flexibility of video decoding may be improved.

Figure 9:
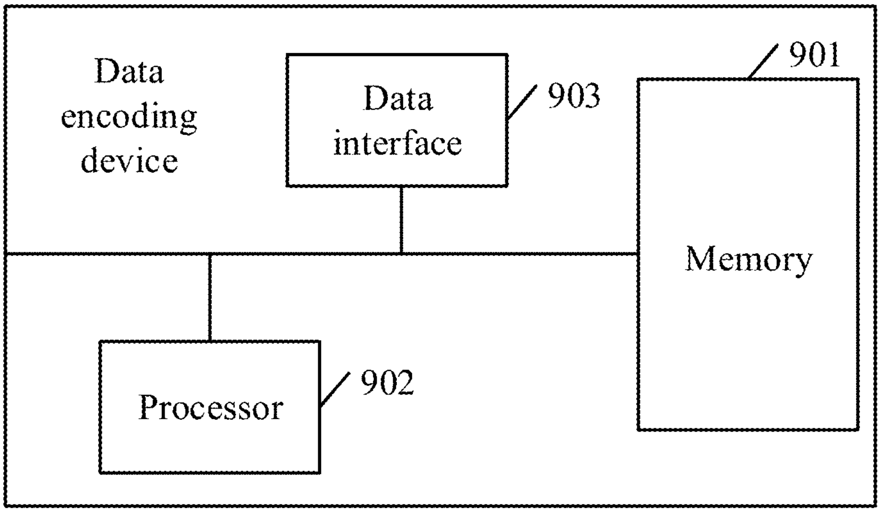
FIG. 9 is a schematic structural diagram of a video encoding device according to some embodiments of the present disclosure.

Referring to FIG. 9, FIG. 9 is a schematic structural diagram of a video encoding device according to some embodiments of the present disclosure. Specifically, the video encoding device includes a memory 901, a processor 902, and a data interface 903.

The memory 901 may include a volatile memory. The memory 901 may also include a non-volatile memory. The memory 901 may further include a combination thereof. The processor 902 may be a central processing unit (CPU). The processor 902 may further include a hardware video encoding device. The hardware video encoding device may be an application-specific integrated circuit (ASIC), a programmable logic device (PLD), or a combination thereof. Specifically, for example, the hardware video encoding device may be a complex programmable logic device (CPLD), a field-programmable gate array (FPGA), or any combination thereof.

Further, the memory 901 may be used to store a program, and when the program is executed, the processor 902 may call the program stored in the memory 901 to perform the following steps:

obtaining color components of an image sequence, the color components including two chrominance components;

performing filtering on a reconstructed block of the color components of at least one image of the image sequence using ALF; and generating a bitstream of the image sequence, wherein in the bitstream, different identifiers are used for the two chrominance components in the syntax element of the image level to indicate whether the corresponding chrominance components are filtered using ALF filter, respectively.

Further, in the bitstream, different identifiers may be used for the two chrominance components in the syntax element of the slice level to indicate whether the corresponding chrominance components are filtered using ALF, respectively.

Further, in the bitstream, for each chrominance component of the two chrominance components, a first identifier may be used in the syntax element of the image block level in the bitstream to indicate whether the chrominance component is filtered using ALF, and when the first identifier indicates that the chrominance component is filtered using ALF, a second identifier may be used to indicate the ALF filter adopted by the chrominance component.

Further, the ALF filter may be a CC-ALF filter.

Further, the image block level may be a CTU level.

Further, the first identifier may be encoded in a context manner, and/or the second identifier may be encoded in a truncated unary manner.

In embodiments of the present disclosure, the video encoding device may be configured to obtain the color components that include the two chrominance components of the image sequence, perform the filtering on the reconstructed block of the color components of the at least one image of the image sequence using ALF, and generate the bitstream of the image sequence. Different identifiers may be used for the two chrominance components in the syntax element of the image level in the bitstream to indicate whether the corresponding chrominance components are filtered using ALF, respectively. In the embodiment, when the filtering is performed using ALF, the process of writing the syntax element by the encoder may be simplified by using different identifiers, and the efficiency and flexibility of video encoding may be improved.

Figure 10:
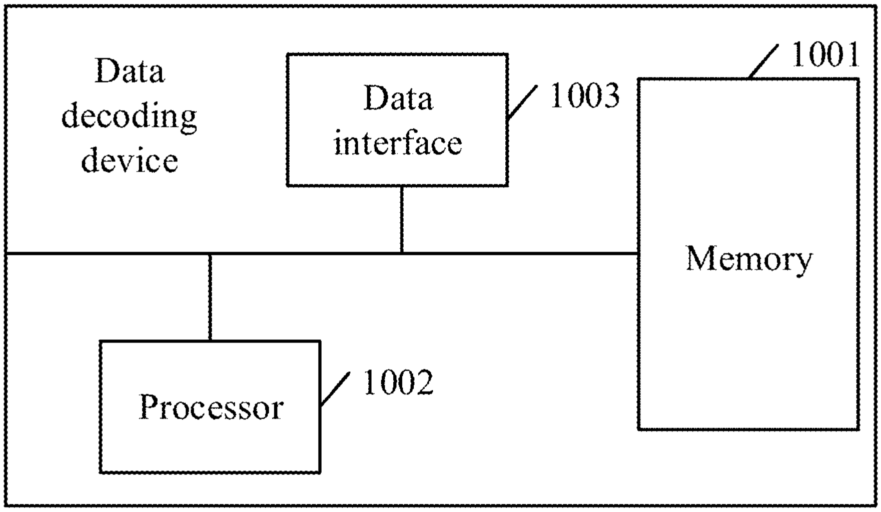
FIG. 10 is a schematic structural diagram of a video decoding device according to some embodiments of the present disclosure.

Referring to FIG. 10, FIG. 10 is a schematic structural diagram of a video decoding device according to some embodiments of the present disclosure. Specifically, the video decoding device includes a memory 1001, a processor 1002, and a data interface 1003.

The memory 1001 may include a volatile memory. The memory 1001 may also include a non-volatile memory. The memory 1001 may further include a combination thereof. The processor 1002 may be a CPU. The processor 1002 may further include a hardware video decoding device. The hardware video decoding device may be an ASIC, a PLD, or a combination thereof. Specifically, for example, the hardware video decoding device may be a CPLD, a FPGA, or any combination thereof.

Further, the memory 1001 may be used to store a program, and when the program is executed, the processor 1002 may call the program stored in the memory 1001 to execute the following steps:

obtaining a bitstream of an image sequence, wherein the image in the image sequence includes two chrominance components, and different identifiers are used for the two chrominance components in the syntax element of the image level in the bitstream to indicate whether the corresponding chrominance components are filtered using ALF;

parsing the bitstream to obtain identifiers corresponding, respectively, to the two chrominance components of the current image; and determining, according to the identifiers corresponding, respectively, to the two chrominance components, whether a reconstructed block of the two chrominance components of the current image is filtered using ALF.

Further, in the bitstream, different identifiers may be used for the two chrominance components in the syntax element of the slice level to indicate whether the corresponding chrominance components are filtered using ALF, respectively.

Further, in the bitstream, for each chrominance component of the two chrominance components, a first identifier may be used in the syntax element of the image block level in the bitstream to indicate whether the chrominance component is filtered using ALF, and when the first identifier indicates that the chrominance component is filtered using ALF, a second identifier may be used to indicate the ALF filter adopted by the chrominance component.

Further, the ALF filter may be a CC-ALF filter.

Further, when parsing the bitstream to obtain the identifiers corresponding, respectively, to the two chrominance components of the current image, the processor 1002 is specifically configured to:

parse the bitstream in a context manner to obtain the first identifier corresponding to the two chrominance components of the current image; and/or parse the bitstream in a truncated unary manner to obtain the second identifier corresponding to the two chrominance components of the current image.

Further, the image block level may be a CTU level.

In embodiments of the present disclosure, the video decoding device may be configured to obtain the bitstream of the image sequence, wherein the image in the image sequence includes the two chrominance components, and different identifiers are used for the two chrominance components in the syntax element of the image level in the bitstream to indicate whether the corresponding chrominance components are filtered using ALF, respectively, parse the bitstream to obtain the identifiers corresponding to the two chrominance components of the current image, and determine whether the reconstructed blocks of the two chrominance components of the current image are filtered using ALF according to the identifiers corresponding to the two chrominance components, respectively. In the embodiment, when the filtering is performed using ALF, the process of reading the syntax element by the decoder may be simplified by using different identifiers, and the efficiency and flexibility of video decoding may be improved.

Figure 11:
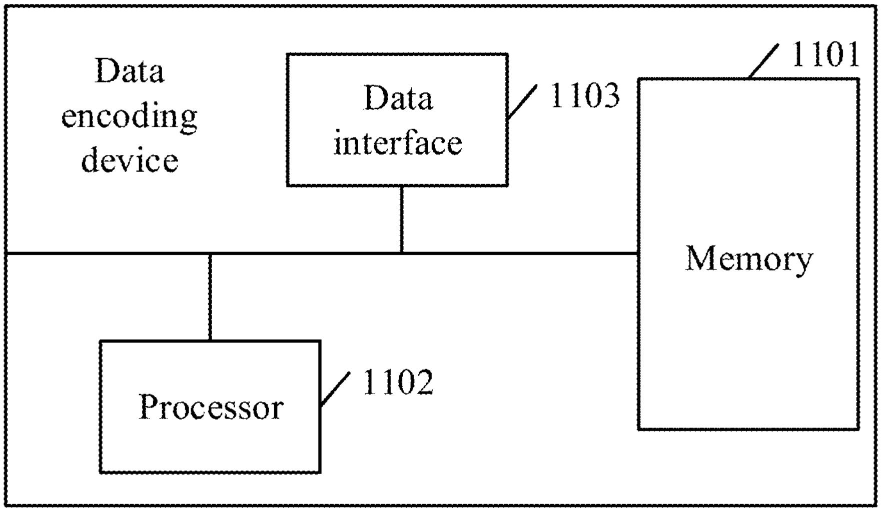
FIG. 11 is a schematic structural diagram of another video encoding device according to some embodiments of the present disclosure.

Referring to FIG. 11, FIG. 11 is a schematic structural diagram of another video encoding device according to some embodiments of the present disclosure. Specifically, the video encoding device includes a memory 1101, a processor 1102, and a data interface 1103.

The memory 1101 may include a volatile memory. The memory 1101 may also include a non-volatile memory. The memory 1101 may further include a combination thereof. The processor 1102 may be a CPU. The processor 1102 may further include a hardware video encoding device. The hardware video encoding device may be an ASIC, a PLD, or a combination thereof. Specifically, for example, the hardware video encoding device may be a CPLD, a FPGA, or any combination thereof.

Further, the memory 1101 may be used to store a program, and when the program is executed, the processor 1102 may call the program stored in the memory 1101 for executing the following steps:

obtaining color components of an image sequence, the color components including two chrominance components;

performing filtering on a reconstructed block of the color components of at least one image in the image sequence using ALF;

generating a bitstream of the image sequence, wherein, for each chrominance component of the two chrominance components, a first identifier is used in the syntax element of the image block level in the bitstream to indicate whether the chrominance component is filtered using ALF, and when the first identifier indicates that the chrominance component is filtered using ALF, a second identifier is used to indicate the ALF filter adopted by the chrominance components.

Further, the ALF filter may be a CC-ALF filter.

Further, the image block level may be a CTU level.

Further, the first identifier may be encoded in a context manner, and/or the second identifier may be encoded in a truncated unary manner.

Further, in the bitstream, different identifiers may be used for the two chrominance components in the syntax element of the image level to indicate whether the corresponding chrominance components are filtered using ALF.

Further, in the bitstream, different identifiers may be used for the two chrominance components in the syntax element of the stripe level to indicate whether the corresponding chrominance components are filtered using ALF, respectively.

In embodiments of the present disclosure, the video encoding device may be configured to obtain the color components that include the two chrominance components of the image sequence, perform the filtering on the reconstructed block of the color components of the at least one image in the image sequence using ALF, and generate the bitstream of the image sequence, wherein, for each chrominance component of the two chrominance components, the first identifier is used in the syntax element of the image block level in the bitstream to indicate whether the chrominance component is filtered using ALF, and when the first identifier indicates that the chrominance component is filtered using ALF, the second identifier may be used to indicate the ALF filter used by the chrominance component In the embodiment, the process of writing the syntax element by the encoder may be simplified by using the first identifier and the second identifier when the filtering is performed using CC-ALF, and the efficiency and flexibility of video encoding may be improved.

Figure 12:
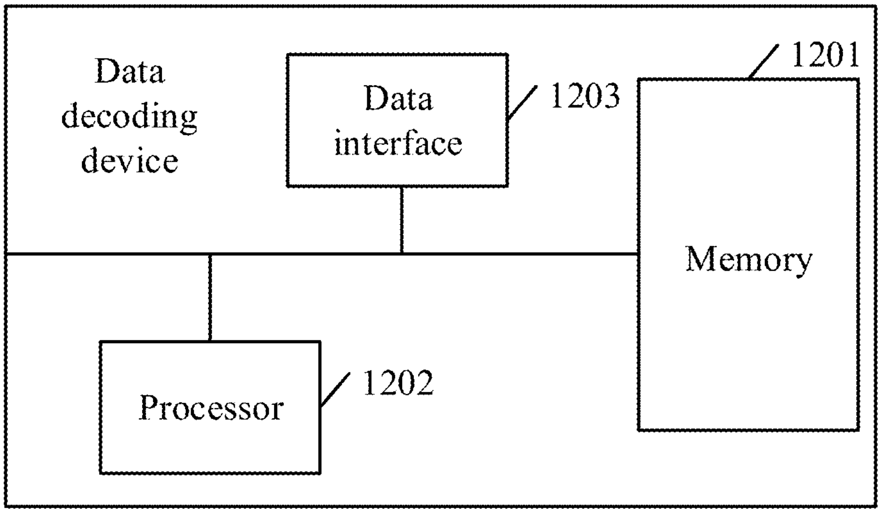
FIG. 12 is a schematic structural diagram of another video decoding device according to some embodiments of the present disclosure.

Referring to FIG. 12, FIG. 12 is a schematic structural diagram of another video decoding device according to some embodiments of the present disclosure. Specifically, the video decoding device includes a memory 1201, a processor 1202, and a data interface 1203.

The memory 1201 may include a volatile memory. The memory 1201 may also include a non-volatile memory. The memory 1201 may further include a combination thereof. The processor 1202 may be a CPU. The processor 1202 may further include a hardware video decoding device. The hardware video decoding device may be an ASIC, a PLD, or a combination thereof. For example, the hardware video decoding device may be a CPLD, a FPGA, or any combination thereof.

Further, the memory 1201 may be used to store a program, and when the program is executed, the processor 1002 may call the program stored in the memory 1201 for executing the following steps:

obtaining a bitstream of an image sequence, wherein an image in the image sequence includes two chrominance components, for each chrominance component of the two chrominance components, a first identifier is used in the syntax element of the image block level in the bitstream to indicate whether the chrominance component is filtered using ALF, and the second identifier is used to indicate the ALF filter adopted by the chrominance component;

parsing the bitstream to obtain a first identifier and a second identifier corresponding to the two chrominance components of the current image, respectively; and for each chrominance component of the current image block, determining, according to the first identifier corresponding to the chrominance component, whether a reconstructed block of the chrominance component is filtered using ALF, and when the reconstructed block of the chrominance component is determined to be filtered using ALF, determining, according to the second identifier, the corresponding ALF filter to perform filtering on the reconstructed block of the chrominance component.

Further, the ALF filter may be a CC-ALF filter.

Further, the image block level may be a CTU level.

Further, when parsing the bitstream to obtain the first identifier and the second identifier corresponding, respectively, to the two chrominance components of the current image, the processor 1002 is specifically configured to:

parse the bitstream in a context manner to obtain a first identifier corresponding to the two chrominance components of a current image from the bitstream; and parse the stream in a truncated unary manner to obtain a second identifier corresponding to the two chrominance components of the current image from the bitstream.

Further, in the bitstream, different identifiers may be used for the two chrominance components in the syntax element of the image level to indicate whether the corresponding chrominance components are filtered using ALF, respectively.

Further, in the bitstream, different identifiers may be used for the two chrominance components in the syntax element of the stripe level to indicate whether the corresponding chrominance components are filtered using ALF, respectively.

In embodiments of the present disclosure, the video decoding device may be configured to determine, for each chrominance component of the current image block, whether the reconstructed block of the chrominance component is filtered using ALF according to the first identifier corresponding to the chrominance component, and when the reconstructed block of the chrominance component is determined to be filtered using ALF, determine, according to the second identifier, the corresponding ALF filter to perform the filtering on the reconstructed block of the chrominance component.

Embodiments of the present disclosure further provide a computer-readable storage medium. The computer-readable storage medium may store a computer program. When the computer program is executed by the processor, the processor may be configured to implement the video encoding methods of FIG. 5 or FIG. 7 of embodiments of the present disclosure, also implement the video decoding methods of FIG. 6 or FIG. 8 of embodiments of the present disclosure, also implement the video encoding devices of FIG. 9 or FIG. 11 of embodiments of the present disclosure, and also implement the video decoding devices of FIG. 10 or FIG. 12 of embodiments of the present disclosure, which are not repeated here.

The computer-readable storage medium may be an internal storage unit of the device of any one of the foregoing embodiments, for example, a hard drive or a memory of the device. The computer-readable storage medium may also be an external storage device of the device, for example, a plug-in hard drive, a smart memory card (SMC), a secure digital card (SD) card, a flash card, etc. Further, the computer-readable storage medium may further include both the internal storage unit of the device and the external storage device. The computer-readable storage medium may be used to store the computer program and other programs and data required by the device. The computer-readable storage medium may also be used to temporarily store data that has been output or to be output.

Those of ordinary skill in the art may understand that all or some of the processes in the methods described above may be implemented by the computer program instructing the related hardware. The program may be stored in the computer-readable storage medium. When the program is executed, flows of the above method embodiments may be included. The storage medium may be a magnetic disk, an optical disk, a read-only memory (ROM), or a random access memory (RAM).

The above disclosure may only include some embodiments of the present disclosure, and certainly cannot be used to limit the scope of the present disclosure. Therefore, equivalent changes made according to the claims of the present disclosure are still within the scope of the present disclosure.

What is claimed is:

1. A video encoding method comprising:

encoding an image to generate a bitstream, wherein in the bitstream, a first syntax element is configured to indicate whether a first chrominance component is filtered by adaptive loop filtering (ALF), and a second syntax element is configured to indicate whether a second chrominance component is filtered by the ALF, the ALF being not a cross-component ALF (CC-ALF) filter, and the first syntax element being different from the second syntax element.

2. The method according to claim 1, wherein:

in the bitstream, for each of the first chrominance component and the second chrominance component, a first identifier is configured in a corresponding syntax element of an image block level in the bitstream to indicate whether the chrominance component is filtered using the ALF, and a second identifier is configured to indicate the ALF filter used by the chrominance component in response to the first identifier indicating that the chrominance component is filtered using the ALF.

3. The method according to claim 2, wherein the image block level is a coding tree unit (CTU) level.

4. The method according to claim 2, wherein:

the first identifier is encoded in a context manner.

5. The method according to claim 2, wherein:

the second identifier is encoded in a truncated unary manner.

6. The method according to claim 1, wherein:

in the bitstream, in response to the first syntax element indicating that the first chrominance component is filtered using the ALF, a first indicator is configured to indicate the ALF filter used by the first chrominance component; or in the bitstream, in response to the second syntax element indicating that the second chrominance component is filtered using the ALF, a second indicator is configured to indicate the ALF filter used by the second chrominance component.

7. The method according to claim 1, wherein each of the first syntax element and the second syntax element is a syntax element of image level in the bitstream.

8. The method according to claim 1, wherein identifier ph_alf_chroma_idc and identifier slice_alf_chroma_idc are not in the bitstream.

9. A video decoding method comprising:

obtaining a bitstream of an image, wherein the image includes a first chrominance component and a second chrominance component, a first syntax element is configured to indicate whether the first chrominance component is filtered by adaptive loop filtering (ALF), and a second syntax element is configured to indicate whether the second chrominance component is filtered by the ALF, the first syntax element being different from the second syntax element;

parsing the bitstream to obtain the first syntax element and the second syntax element; and determining, according to the first syntax element and the second syntax element, whether the first chrominance component and the second chrominance component of the image are filtered using the ALF, the ALF being not a cross-component ALF (CC-ALF) filter.

10. The method according to claim 9, wherein:

in the bitstream, for each of the first chrominance component and the second chrominance component, a first identifier is used in a corresponding syntax element of an image block level in the bitstream to indicate whether the chrominance component is filtered using the ALF, and a second identifier is used to indicate the ALF filter used by the chrominance component in response to the first identifier indicating that the chrominance component is filtered using the ALF.

11. The method according to claim 10, wherein parsing the bitstream to obtain the first syntax element and the second syntax element includes at least one of:

parsing the bitstream in a context manner to obtain the first identifier corresponding to the first chrominance component and the first identifier corresponding to the second chrominance component of the image from the bitstream; or parsing the bitstream in a truncated unary manner to obtain the second identifier corresponding to the first chrominance component and the second identifier corresponding to the second chrominance component of the image.

12. The method according to claim 10, wherein the image block level is a coding tree unit (CTU) level.

13. The method according to claim 10, wherein:

the first identifier is encoded in a context manner.

14. The method according to claim 10, wherein:

the second identifier is encoded in a truncated unary manner.

15. The method according to claim 9, wherein:

in the bitstream, in response to the first syntax element indicating that the first chrominance component is filtered using the ALF, a first indicator is configured to indicate the ALF filter used by the first chrominance component; or in the bitstream, in response to the second syntax element indicating that the second chrominance component is filtered using the ALF, a second indicator is configured to indicate the ALF filter used by the second chrominance component.

16. A bitstream generating method comprising:

obtaining color components of an image, the color components including a first chrominance component and a second chrominance component; and generating a bitstream of the image, wherein in the bitstream, a first syntax element is configured to indicate whether the first chrominance component is filtered by adaptive loop filtering (ALF), and a second syntax element is configured to indicate whether the second chrominance component is filtered by the ALF, the ALF being not a cross-component ALF (CC-ALF) filter, and the first syntax element being different from the second syntax element.

17. The method according to claim 16, wherein:

in the bitstream, for each of the first chrominance component and the second chrominance component, a first identifier is configured in a corresponding syntax element of an image block level in the bitstream to indicate whether the chrominance component is filtered using the ALF, and a second identifier is configured to indicate the ALF filter used by the chrominance component in response to the first identifier indicating that the chrominance component is filtered using the ALF.

18. The method according to claim 17, wherein:

the first identifier is encoded in a context manner.

19. The method according to claim 17, wherein:

the second identifier is encoded in a truncated unary manner.

20. The method according to claim 16, wherein:

in the bitstream, in response to the first syntax element indicating that the first chrominance component is filtered using the ALF, a first indicator is configured to indicate the ALF filter used by the first chrominance component; or in the bitstream, in response to the second syntax element indicating that the second chrominance component is filtered using the ALF, a second indicator is configured to indicate the ALF filter used by the second chrominance component.

* * * * *